(No Model.)  3 Sheets—Sheet 1.

J. A. BOWDEN.
FILTER.

No. 429,112.  Patented June 3, 1890.

WITNESSES
C. J. Shipley
F. Clough

INVENTOR
Junius A. Bowden
By Wells W. Leggett & Co.
Attorneys.

(No Model.) 3 Sheets—Sheet 2.

J. A. BOWDEN.
FILTER.

No. 429,112. Patented June 3, 1890.

WITNESSES
C. J. Shipley
J. Clough

INVENTOR
Junius A. Bowden
By Wells N. Leggett & Co.
Attorneys.

(No Model.)
J. A. BOWDEN.
FILTER.
No. 429,112.   Patented June 3, 1890.
3 Sheets—Sheet 3.
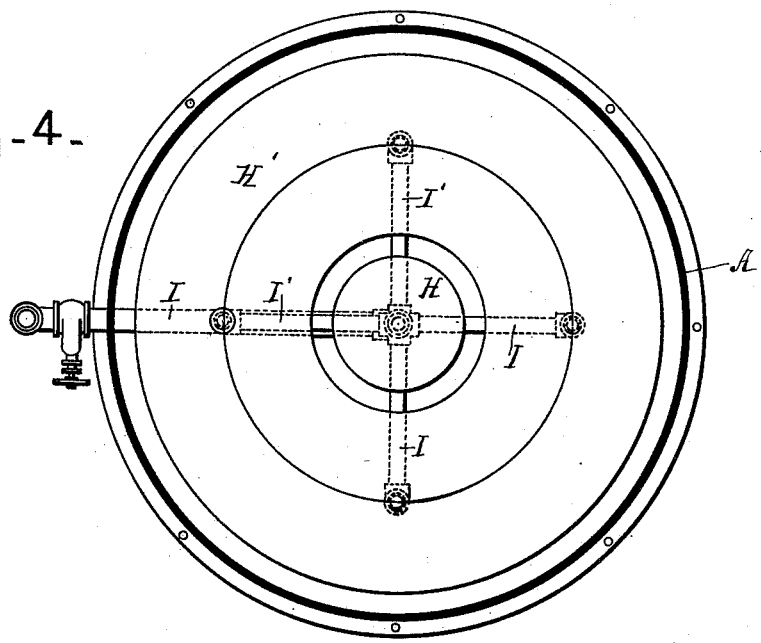
Fig-4-
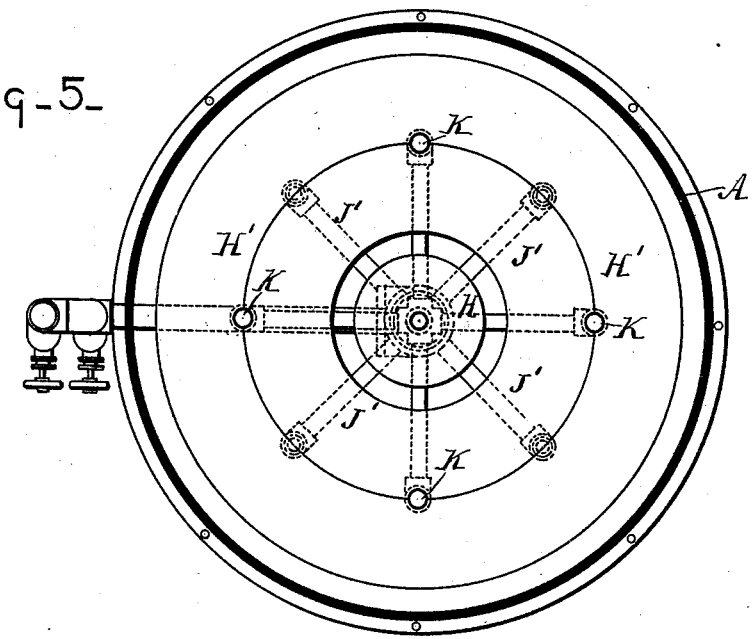
Fig-5-
WITNESSES
C. J. Shipley
F. Clough.
INVENTOR
Junius A. Bowden
By Wells W. Leggett & Co.
Attorneys.

UNITED STATES PATENT OFFICE.

JUNIUS A. BOWDEN, OF DETROIT, MICHIGAN.

FILTER.

SPECIFICATION forming part of Letters Patent No. 429,112, dated June 3, 1890.

Application filed August 17, 1889. Serial No. 321,053. (No model.)

*To all whom it may concern:*

Be it known that I, JUNIUS A. BOWDEN, a citizen of the United States, residing at Detroit, county of Wayne, State of Michigan, have invented a certain new and useful Improvement in Filters; and I declare the following to be a full, clear, and exact description of the invention, such as will enable others skilled in the art to which it pertains to make and use the same, reference being had to the accompanying drawings, which form a part of this specification.

My invention is designed to produce a filter which may be cheaply constructed and yet durable and effective in operation; and it consists, essentially, of a tank of the desired size suitably divided into two compartments, one above the other, each compartment provided with suitable filtering material and suitable connections, whereby the water to be filtered after passing through one compartment will be passed through the other.

My invention also contemplates suitable connections whereby each compartment can be cleaned independent of the other, and in other novel features of construction hereinafter described and claimed.

Figure 1:
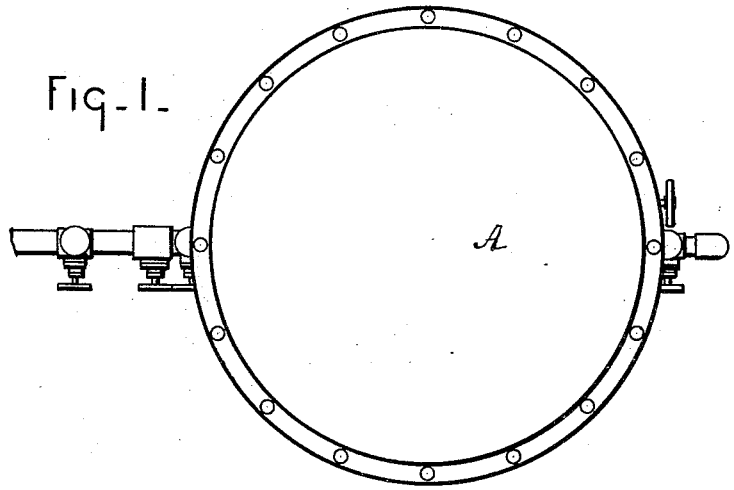
Figure 2:
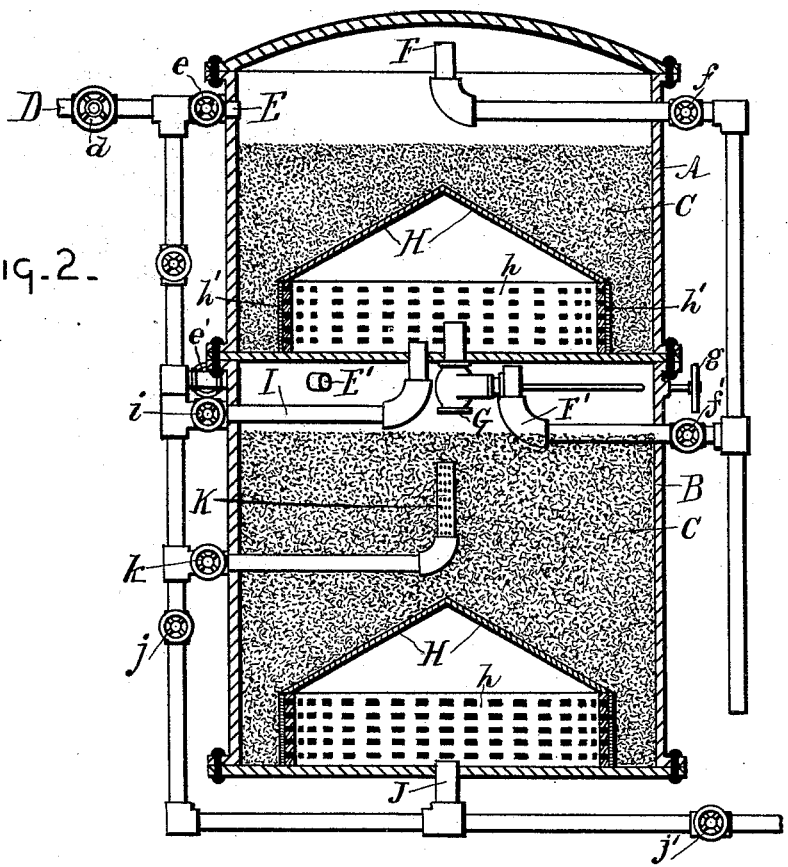
Figure 3:
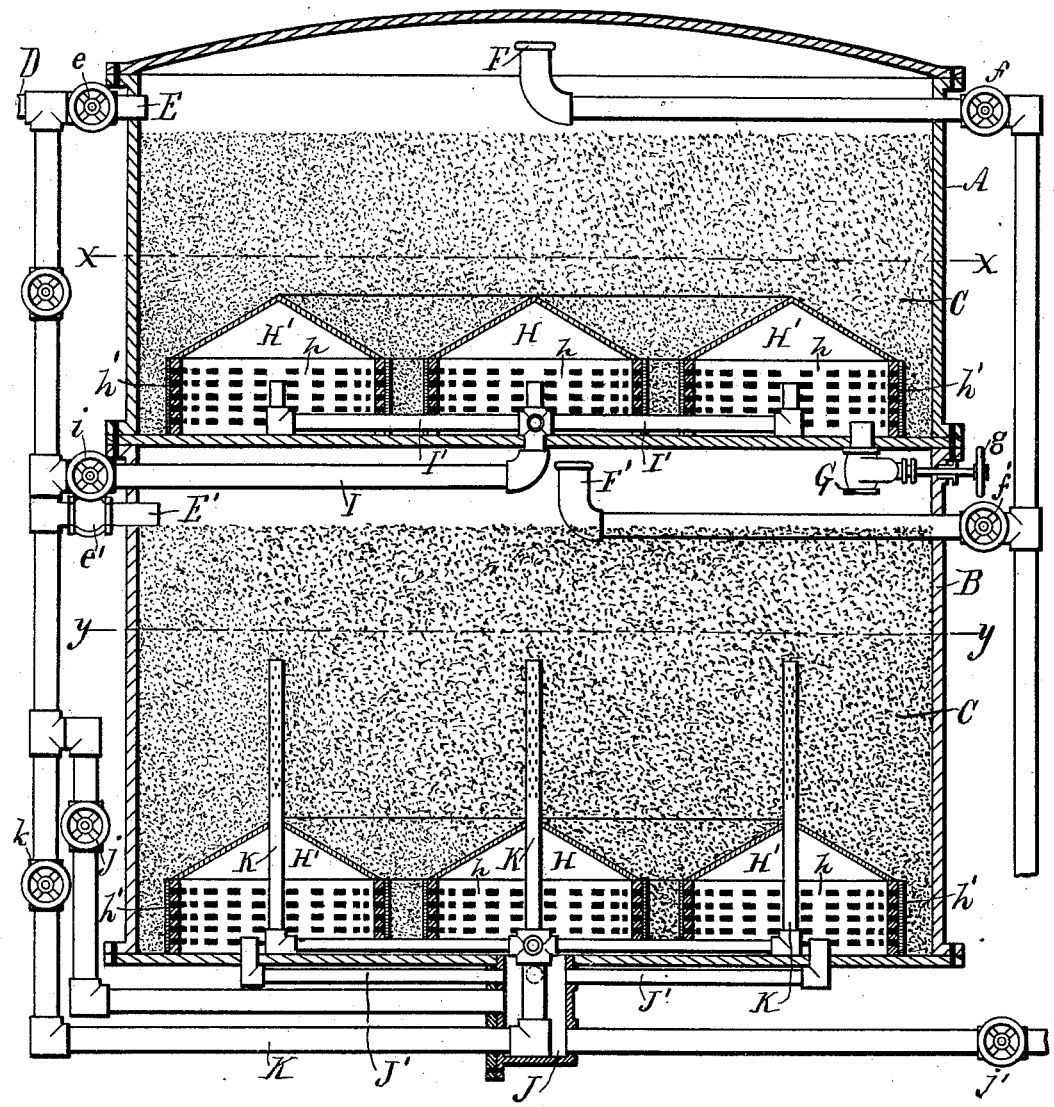

In the drawings, Figure 1 is a plan view of my filter. Fig. 2 is a vertical section of the same. Fig. 3 is a vertical section of a variation, showing the apparatus when constructed on a larger scale. Fig. 4 is a plan view of the upper compartment on the line $x\ x$ of Fig. 3. Fig. 5 is a plan view of the lower compartment on the line $y\ y$ of Fig. 3.

In carrying out my invention, A represents the upper chamber, and B the lower chamber, of my filter.

C represents the filtering material.

D is the main supply-pipe controlled by the valve $d$.

E is the inlet-pipe of the upper chamber, controlled by the valve $e$, and E' the inlet-pipe of the lower chamber, controlled by the valve $e'$.

F is the outlet from the upper chamber of the cleansing-water after it has passed through the filter-bed, and is controlled by the valve $f$, and F' $f'$ are the corresponding outlet and valve for the lower chamber.

G is the outlet from the upper chamber to the lower, and is controlled by the valve $g$.

H is a cone-shaped imperforate wall or diaphragm supported clear of the bottom of the compartment by a perforated screen $h$, and, if desired, a finer perforated screen $h'$ may be placed adjacent to the first. One or more of these diaphragms are placed in each compartment, and above and around them is located the filtering material.

I is a pipe opening into the upper compartment beneath the diaphragm and governed by the valve $i$. This pipe may be used either for a drain from the upper compartment when it is being used alone, or it may be used as an inlet-pipe when the upper compartment is being cleaned.

J is the corresponding outlet for the lower compartment, and may also be used as the inlet when the compartment is being cleaned. It is governed by the valves $j\ j'$.

I will now explain the operation of my filter. All valves except $e\ g$ and $j'$ are closed. Water to be filtered is discharged at E. It passes through the filtering-bed C of the upper chamber, through the screens $h\ h'$, through the pipe G, through the filtering-bed of the lower chamber and the screens $h\ h'$, and off through the outlet J. To clean the upper compartment the valves $e\ g$ are closed and the valves $i\ f$ opened. The water under pressure is then discharged into the compartment under the diaphragm and passes through the screens and up through the filtering material. The water as it rises above the edge of the diaphragm will carry more or less of the filtering material, and as this is carried up new material will slide down the incline to fill the space, and a circulation is thus obtained, whereby the material is thoroughly cleaned. The water, after passing through the filtering-bed, is carried off through the outlet F. The lower compartment is cleaned in a similar manner; but, being preferably larger than the upper one, it is sometimes necessary to have a means for loosening the filtering material above the diaphragm in order to have it circulate properly. To do this I provide the perforated pipe K, controlled by the valve $k$, and by discharging a quantity of water into the center of the bed by means of this pipe the water issuing from beneath the diaphragm will cause the bed to circulate properly while being cleaned.

In Figs. 3, 4, and 5 I have illustrated my invention in connection with a larger apparatus. In these large filters a single diaphragm in a compartment would not be sufficient. I therefore provide the center conical diaphragm H, and surround this by a diaphragm in the shape of a conical ring H' and support it by the screens. The pipes I and J may then be provided with branches I' J', extending to the different points under the outer diaphragm, whereby the water for cleansing is discharged into the bed from a large number of points. So, also, a series of the loosening-pipes K may be provided, if desired.

Of course, instead of the conical-shaped diaphragms which form two inclined surfaces, I might make a single inclined diaphragm and so arrange the inlet-pipe that the water for cleansing the bed will be discharged at the base of the incline. This would of course be the equivalent of the double incline or cone-shaped diaphragm and would be contemplated by my invention. So, also, for a very small filter one compartment would be sufficient, and I do not care to limit myself to a construction in which there are two compartments, although the latter form is preferable.

What I claim is—

1. In a filter, the combination, with a suitable filter-bed through which the water is passed, of an inclined imperforate wall or diaphragm beneath said bed and a water-inlet pipe located adjacent to the base of the incline, whereby a discharge of water under pressure into the bed at the base of the incline will create a circulation of the material composing the bed, substantially as described.

2. A filter consisting of an upper and lower compartment, each having a bottom wall, a filter-bed in each compartment, inlet and outlet pipes to each compartment, a conical wall or diaphragm arranged in each compartment and supported above the bottom wall thereof below the filter-bed, and water-inlet pipes which respectively discharge water beneath the conical walls or diaphragms for cleaning the filter-beds, substantially as described.

3. In a filter, the combination, with the filtering-bed, an inclined diaphragm or diaphragms located beneath said bed, and water-inlet pipes located beneath said diaphragms, of loosening-pipes K, located in the bed above the diaphragms, substantially as described.

In testimony whereof I sign this specification in the presence of two witnesses.

JUNIUS A. BOWDEN.

Witnesses:
WM. M. STEUART,
W. H. CHAMBERLIN.